United States Patent [19]

McKinnon

[11] Patent Number: 5,178,752
[45] Date of Patent: Jan. 12, 1993

[54] APPARATUS FOR SEPARATION OF SOLID AND LIQUID MATERIALS

[76] Inventor: Nicholas McKinnon, 381 Pine St., Marshfield, Mass. 02050

[21] Appl. No.: 557,544

[22] Filed: Jul. 24, 1990

[51] Int. Cl.⁵ .............................................. B01D 36/02
[52] U.S. Cl. ................................... 210/121; 210/153; 210/315; 210/316; 210/416.1; 210/474; 210/498; 210/499
[58] Field of Search ............... 210/121, 316, 317, 335, 210/416.1, 498, 153, 473, 474, 477, 499, 315; 417/40; 4/289, 290–292

[56] References Cited

U.S. PATENT DOCUMENTS

| | | | |
|---|---|---|---|
| 658,639 | 9/1900 | Guion .................................. | 210/317 |
| 1,065,335 | 6/1913 | Barton et al. ....................... | 210/499 |
| 3,638,799 | 2/1972 | Serowiecki ......................... | 210/474 |
| 4,171,186 | 10/1979 | Chapman ............................ | 417/40 |

FOREIGN PATENT DOCUMENTS

| | | | |
|---|---|---|---|
| 362739 | 4/1990 | European Pat. Off. ............ | 210/335 |
| 8812477U1 | 12/1988 | Fed. Rep. of Germany . | |

Primary Examiner—Robert A. Dawson
Assistant Examiner—Matthew O. Savage

[57] ABSTRACT

Apparatus is disclosed for separation of liquid and solid waste materials from a mixture or other combination of such materials. A container is provided with a vertically disposed interior screen or perforated wall that is capable of retaining solid material while permitting liquid material to pass therethrough. The perforated wall divides the container into first and second portions. Waste material is provided to the first portion, and liquid material is removed from the second portion. Preferably disposed in the first portion is an onion bag or other porous, screening or filtering material for receiving the combination of liquid and solid material and retaining of the solid material. Liquid material can be removed from the second portion via a drain, or alternatively by a pump controlled by a liquid level sensor. The pump would be operated whenever the liquid level sensor sensed a sufficiently high predetermined level of liquid in the container.

7 Claims, 2 Drawing Sheets 5,178,752

APPARATUS FOR SEPARATION OF SOLID AND LIQUID MATERIALS

FIELD OF THE INVENTION

The present invention relates to devices for handling of solid and liquid materials, and more particularly to devices for separation of solid and liquid materials.

BACKGROUND OF THE INVENTION

At supermarkets, fish processing plants, and other like establishments, waste products are produced in the course of preparing food products for distribution and/or sale. Such waste products, which have been collectively referred to as "gurry", can include animal fat, waste from produce, fish offal, other offal, waste or by products of processing, the viscera and trimming of a butchered animal removed in dressing, and other rubbish. Although in the following discussion a supermarket will be referred to, nonetheless, it should be understood that the present invention is not to be construed as being limited thereto.

Obviously, such gurry must be removed from the area where such processing is taking place, not only for reasons of cleanliness and hygiene, but also to prevent build up of such waste that would interfere with efficient processing. One prior art method of so disposing is illustrated in FIG. 1. In FIG. 1, a supermarket layout 10 includes at least one room 12 where food processing is accomplished. Although it is contemplated that more than one room could be utilized for such purpose, nonetheless only one such room 12 is illustrated for simplicity of illustration. Scraps and other wastes 14 are shown disposed on the floor 16 of such a room 12. The floor 16 of room 12 is provided with a drain 18 into which such waste 14 can be placed such as by sweeping or washing the floor 16. Drain 18 is connected to a drainage pipe 20 which can also convey waste from other processing rooms (not illustrated). Drainage pipe 20 can for example be of metal. Drainage pipe 20 is dispose so that waste 14 would flow from drain 18 to pit area or similar disposal room 22. In drainage pipe 20, the waste includes at least some liquid content. Drainage pipe 20 delivers the waste to a perforated box 24. Box 24 is disposed in a sink 26 that has a conventional trap-type drain 28. Box 24 is provided with ears or projections 30 to support the box on sink 26 so that liquid may drain from the box into drain 28. A pump 32 is disposed downstream of drain 28 for more effective removal of materials from the drain than would be accomplished by a mere gravity feed.

While such devices have served the purpose, they have not proven entirely satisfactory under all conditions of service in that the solid waste deposited into box 24 tends to build up and plug sink 26 and its drain 28. This can cause overflowing of the sink 26. Solid material could also escape box 24, enter drain 28, and possibly damage downstream pump 32. These problems are overcome by the present invention.

SUMMARY OF THE INVENTION

Accordingly, it is the general purpose of the present invention to provide apparatus capable of separating solid material from liquid material with which it has been previously mixed or otherwise combined.

Other objects of the present invention are to provide apparatus for filtering solid waste material out of liquid waste material, retaining such filtered out solid material, avoiding backups that may be caused by substantial amount of such solid material, and keeping open conduits provided for removal of such liquid material.

Briefly, these and other objects of the present invention are accomplished by porous or screening or filtering material located to receive effluent from a drainage pipe and configured to collect solid material from such effluent while permitting liquid effluent material to drain therefrom. The porous, screening or filtering material is disposed in a first portion of a container. First and second portions of the container are defined and separated by a substantially vertical, perforated wall or screen. The wall or screen provides a further check on any remaining solid material while permitting liquid to freely pass therethrough. Disposed in the second portion of the container is a device for sensing the level of liquid in the container. Also disposed in the second container portion is a device for selectively pumping or otherwise removing such liquid from the container into an external drain. The sensing device is operatively connected to the pumping device.

Other objects, advantages, and novel features of the invention will become apparent from the following detailed description of the invention when considered in conjunction with the accompanying drawings.

DETAILED DESCRIPTION

Figure 1:
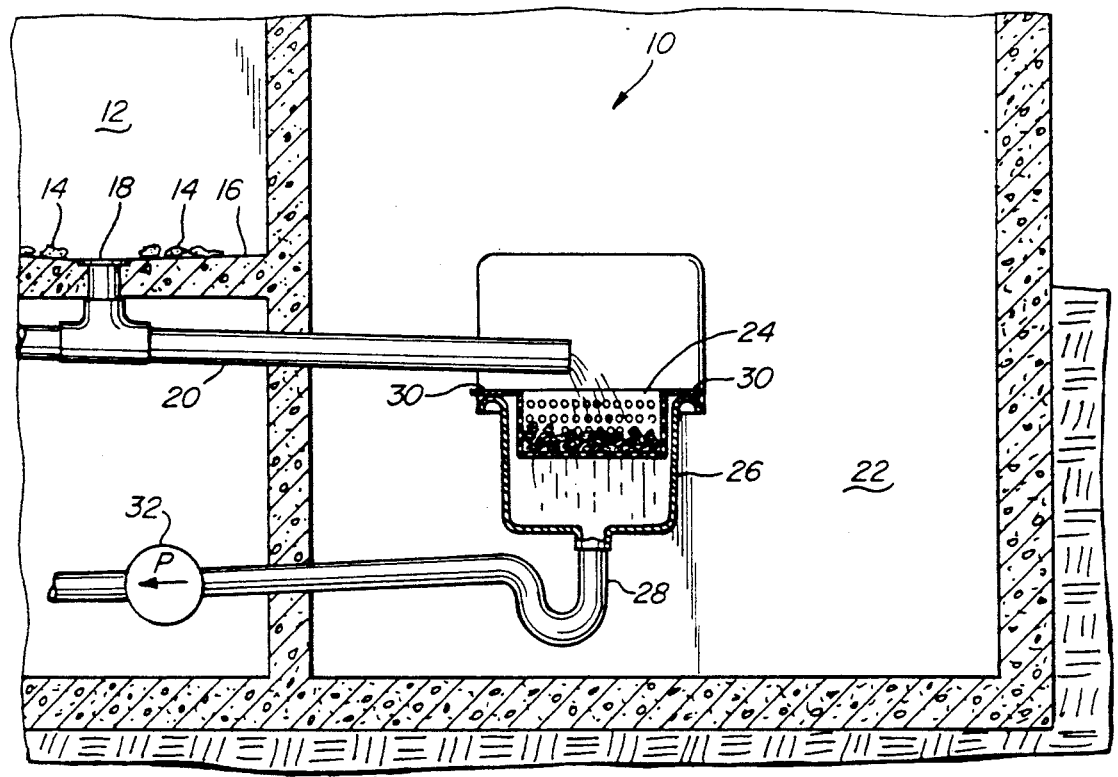
FIG. 1 illustrates apparatus for separation of solid waste from liquid waste according to the prior art.
Figure 2:
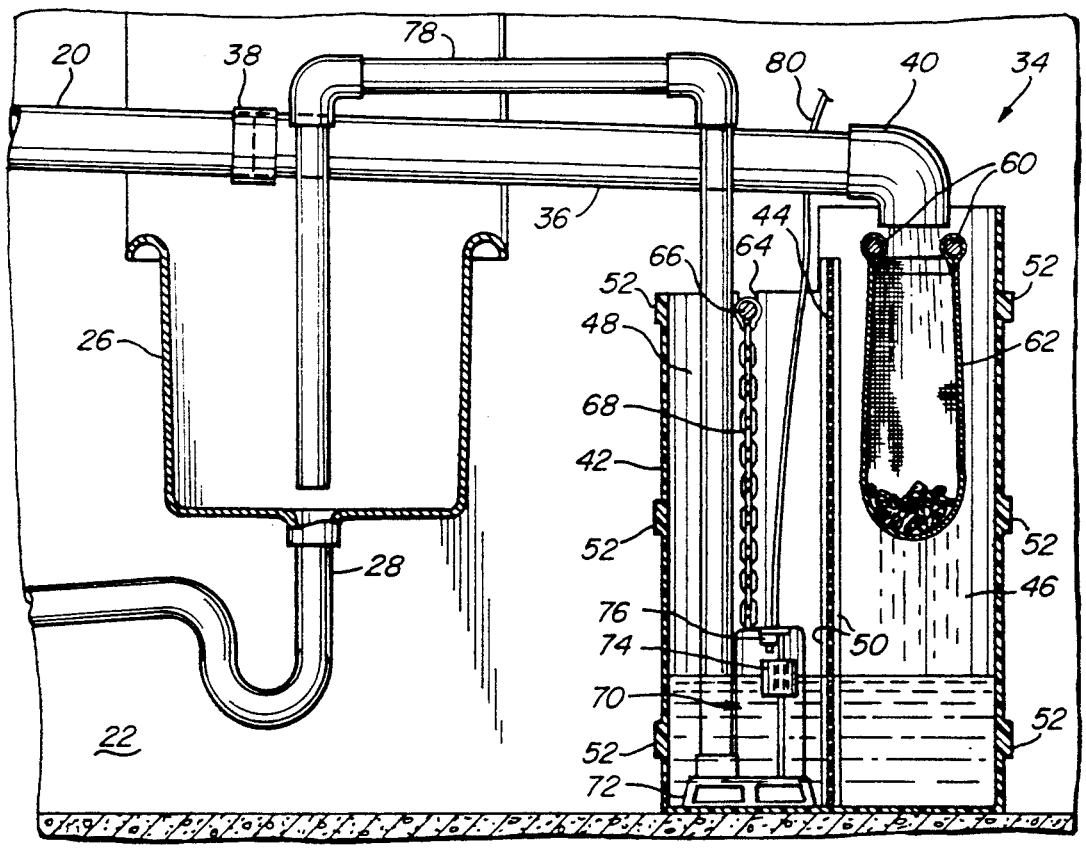
FIG. 2 is a side, partially sectional view of apparatus for separation of solid waste from liquid waste according to the present invention.

Referring now to the drawings, wherein like reference characters designate like or corresponding parts throughout the several views, there is shown in FIG. 2, disposed in a pit area or similar disposal room 22, an apparatus generally indicated as 34 for separation of solid from liquid gurry and other waste. As illustrated in FIG. 2, an extension 36 is attached via coupling 38 to drainage pipe 20. Extension pipe 36 thereby bypasses sink 26. Extension pipe 36 is provided at its free end with an elbow 40 which extends into the top of tank, bucket or other container 42. Extension pipe 36, coupling 38, and elbow 40 can for example each be of PVC (polyvinyl chloride).

Figure 3:
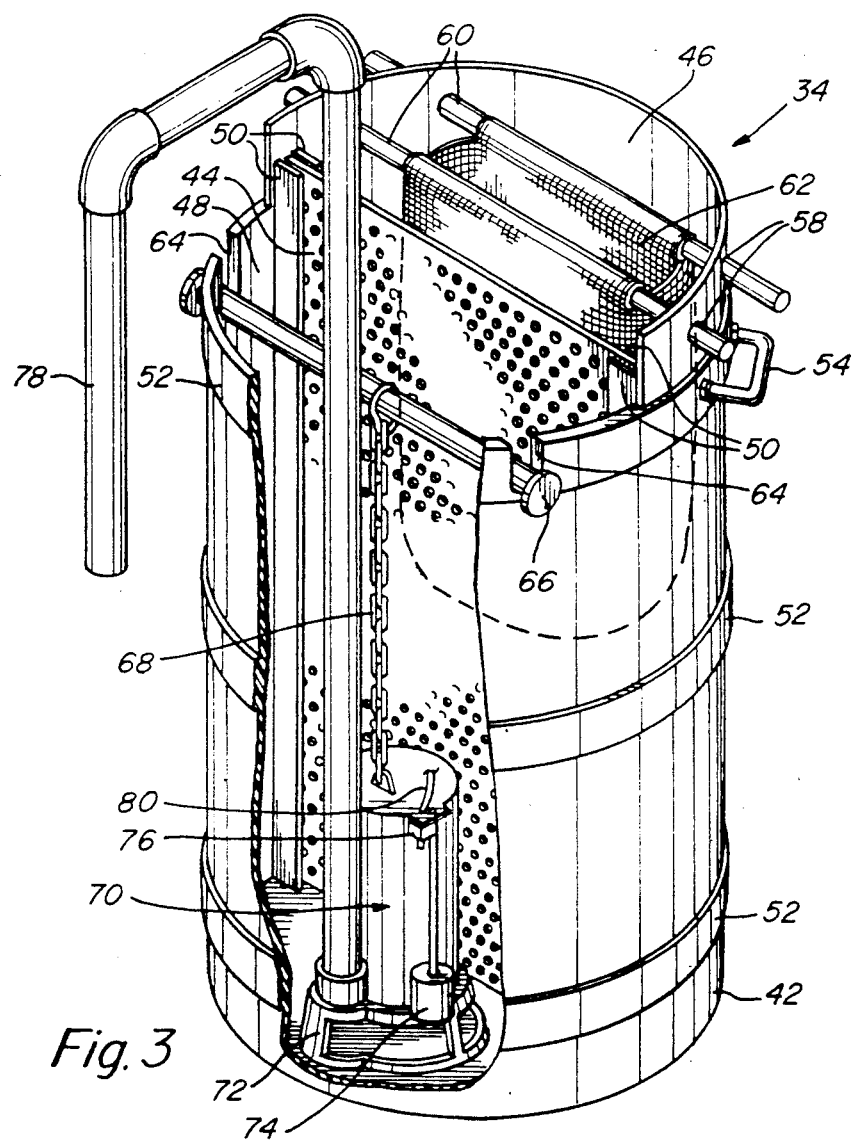
FIG. 3 is an isometric, partially sectional view of one portion of the apparatus of FIG. 2.
Figure 4:
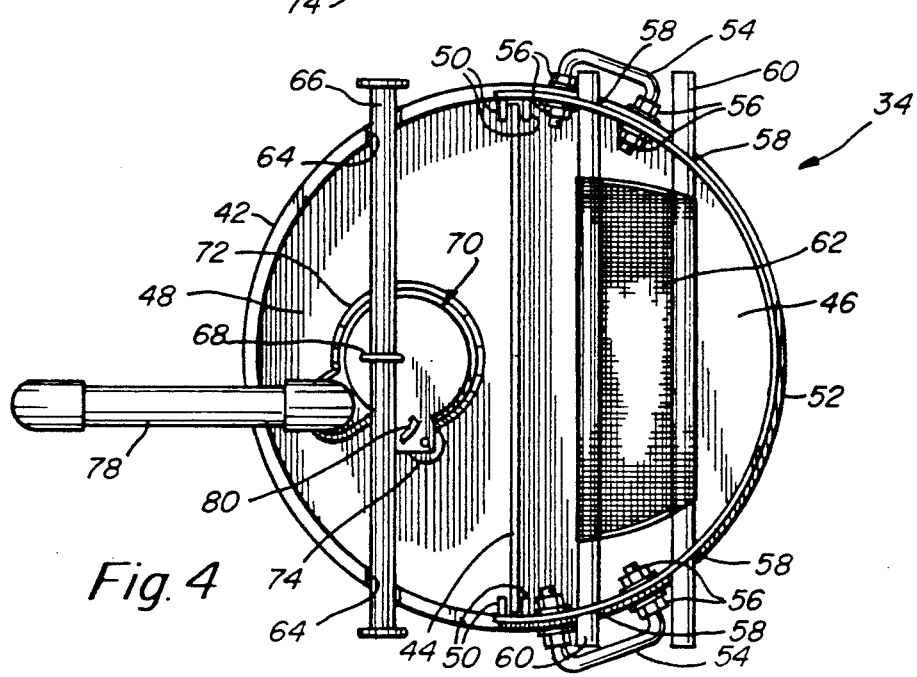
FIG. 4 is a top view of the device of FIG. 3.

Tank 42 is provided with a screen or perforated wall 44 separating tank 42 into a first portion 46 and a second portion 48. Wall 44 can for example be a flat piece of ¼ inch thick white PVC provided with a regular array of staggered ⅜ inch diameter holes. Tank 42 can for example also be of ¼ inch thick PVC. As also shown in FIGS. 3 and 4, wall 44 is removably held vertically in place in tank 42 by and between paired flanges or extensions 50. Each flange 50 can for example be a 1 inch wide piece of PVC that can be glued to the inside of the wall of tank 42, with a ¼ inch space being provided between each adjacent parallel pair of flanges for insertion and retention of wall 44.

Tank 42 can furthermore be provided with one or more reinforcing strips 52 circumferentially arranged about the tank. Each reinforcing strip 52 can for example be of PVC and be 2½ inches wide and ¼ inch thick. Tank 42 can for example have a diameter of 24 inches, and have a height of 40 inches at first portion 44 and a height of 36 inches at second portion 48. Tank 42 can be provided near the top of the exterior of first portion 46 with two handles 54. Handles 54 can for example each be of appropriately formed stainless steel rods having a diameter of 5/16" with each end having a thread of 5/16"-20. Each handle 54 can for example be 5" long by 3" wide. Each handle 54 can further include stainless steel nuts 56 each configured to engage the end threading to hold the handle in place on tank 42.

The present invention can be practiced utilizing only screen 44 for filtering solid waste from liquid waste. Still, it is preferred to also utilize a porous, screening or filtering material for such separation.

Tank 42 is also provided at its first portion 46 with two pairs of holes 58 for supporting rods 6. Support rods 6 are disposed in parallel. Each support rod 60 can for example be of PVC or metal with a diameter of 1". Elbow 40 is positioned above the space between rods 60 so that any effluent from drainage pipe 20 falls between rods 60. An onion bag 62 is hung from support rods 60 and is positioned to receive gurry effluent from elbow 40. Onion ba 62 is porous and permits the water and other liquid content of the gurry to pass therethrough. Liquid falling from onion ba 62 flows through perforated wall 44. A bag or other partial enclosure of porous, screening or filtering material could be utilized in lieu of onion bag 62. For example, burlap or other cloth could be so used. Alternatively, hardware cloth or screening could be so used.

The top of the second portion 48 of tank 42 is also provided with a pair of notches 64. Notches 64 are configured to receive and support a support rod 66. Support rod 66 can for example be of metal, ut is preferably of PVC like tank 42 and reinforcing strips 52. Rod 66 can for example have a diameter of 1¼". Pump suspension rod 66 has attached thereto a chain 68 which is connected to automatic pump 70. Chain 68 can for example be of stainless or galvanized steel. Pump 70 is provided with a base 72 to keep it raised off the bottom of tank 42 for more effective pumping action. Pump 70 is furthermore supported by chain 68, rod 66, and tank 42. Open base 72 permits inflow of liquid to the bottom of pump 70 so that pump 70 can pump such liquid out of the bottom of tank 42. Pump 70 is furthermore provided with a float 74 which is operatively connected to switch 76. Float 74 is suspended from pump 70 to sense the level of liquid in tank 42. When the liquid in tank 42 reaches a predetermined desired level for pumping, then float 74 is raised to indicate that level by the liquid in tank 42, thereby triggering switch 76. Switch 76 then turns pump 70 on. Liquid entering open base 72 is then pumped by pump 70 out of tank 42 via line or pipe 78 to drain 28 of sink 26. Line 78 can for example be of PVC pipe. Preferably, a 1½" air gap should be left between the free end of line 78 and the bottom inside surface of sink 26. Electric line 80 provides electric power to pump 70 and switch 76. When the liquid level in tank 42 is reduced by pump 70 to a sufficiently low predetermined level, the corresponding resulting position of float 74 will result in shutoff of pump 70 via switch 76.

Alternatively, tank 42 could be positioned in or above sink 26. In such a configuration, the bottom or side of second portion 48 could be provided with a hole or drain (not shown) from which liquid effluent could be provided to drain 28 directly or via a pipe or line. Tank 42 could then utilize float 74 and switch 76 to open or close such hole or drain of tank 42 in response to liquid level.

It should be understood that, although various preferred materials have been described above, the invention can be practiced with other materials. For example, any reasonably hard, suitably formable material could be used for extension 36, coupling 38, elbow 40, tank 42, screen 44, flanges 50, strips 52, handles 54, nuts 56, rods 60, rod 66, chain 68, line 78, etc. Also, any sufficiently strong porous or screen-type or filter material could be utilized in lieu of onion bag 62.

Some of the many advantages of the invention should now be readily apparent. For example, a novel waste separation system has been provided which is capable of separating solid material from liquid material. The system is capable of filtering solid waste material out of liquid waste material, and retaining such filtered-out solid material, thereby avoiding backups that may be caused by substantial amounts of such solid material, and keeping open conduits provided for removal of such liquid material.

Obviously, many modifications and variations of the present invention are possible in light of the above teachings. It is therefore to be understood that the foregoing embodiment is presented by way of example only and that, within the scope of the appended claims and equivalents thereto, the invention may be practiced otherwise than as specifically described.

What is claimed:

1. Apparatus for receiving effluent comprised of solid and liquid effluent material and separating the solid effluent material from the liquid effluent material for the purpose of collection, said apparatus comprising:

a container having a closed bottom surface and an open top end facing opposite said closed bottom surface;

means for separating the container into separate respective solid and liquid effluent chambers, said means for separating extending in a plane substantially perpendicular to said closed bottom surface;

means for directing the solid and liquid effluent material to the open top end of the container into said solid effluent chamber;

a porous bag disposed in said solid effluent chamber for substantially separating liquid effluent material from solid effluent material and having an open top end;

said means for directing the effluent material having an outlet port disposed within said open top end of said container and aligned with said open top end of said porous bag, said outlet port for directing said effluent to fall by gravity into said open top end of said porous bag;

means attached to said container for disposing the porous bag such that said porous bag is hanging in said solid effluent chamber and such that said porous bag is positioned to receive the solid and liquid effluent material therein;

means disposed in the liquid effluent chamber for enabling collected liquid effluent material received from said porous bag, absent any substantial solid effluent material removed by said porous bag, to be directed to a liquid drain;

wherein said means for disposing the porous bag is arranged to dispose the porous bag above the closed bottom surface of said container with a gap between said bag and the closed bottom surface of said container;

said container including means for releasably supporting said means for disposing said porous bag; and, said porous bag including means in the vicinity of said bag open top end for releasable connection to said means for disposing the porous bag.

2. Apparatus as recited in claim 1 wherein said means separating the container into separate chambers includes a perforated wall that is disposed substantially vertically in the container.

3. Apparatus as recited in claim 2 wherein said hanging porous bag is disposed substantially parallel to said vertical perforated wall.

4. Apparatus as recited in claim 1 wherein said means disposed in the liquid effluent chamber includes a pump.

5. Apparatus as recited in claim 4 including conduit means for coupling the pump to the liquid drain.

6. Apparatus as recited in claim 5 including float means for controlling the pump as a function of the liquid level in the container.

7. Apparatus as recited in claim 1 wherein said solid effluent chamber and said liquid effluent chamber together have a single planar continuous level bottom surface defined by the bottom of said container.

* * * * *